US012424065B2

United States Patent
Ryan et al.

(10) Patent No.: US 12,424,065 B2
(45) Date of Patent: *Sep. 23, 2025

(54) PRESENCE DETECTION AND INDICATOR SYSTEM AND METHOD

(71) Applicant: Sentry Protection LLC, Lakewood, OH (US)

(72) Inventors: James P. Ryan, Lakewood, OH (US); Jeffrey P. Wagner, Greenfield, IN (US)

(73) Assignee: Sentry Products LLC, Lakewood, OH (US)

( * ) Notice: Subject to any disclaimer, the term of this patent is extended or adjusted under 35 U.S.C. 154(b) by 121 days.

This patent is subject to a terminal disclaimer.

(21) Appl. No.: 18/126,884

(22) Filed: Mar. 27, 2023

(65) Prior Publication Data

US 2023/0306827 A1 Sep. 28, 2023

Related U.S. Application Data

(60) Provisional application No. 63/324,140, filed on Mar. 27, 2022.

(51) Int. Cl.
*G08B 5/36* (2006.01)
*G08B 13/196* (2006.01)

(52) U.S. Cl.
CPC ........... *G08B 5/36* (2013.01); *G08B 13/1961* (2013.01); *G08B 13/19632* (2013.01); *G08B 13/19645* (2013.01); *G08B 13/19656* (2013.01)

(58) Field of Classification Search
CPC .......... G08B 5/36; G08B 13/1961; G08B 13/19632; G08B 13/19645; G08B 13/19656

USPC ......................................................... 340/332
See application file for complete search history.

(56) References Cited

U.S. PATENT DOCUMENTS

| | | | |
|---|---|---|---|
| 8,686,874 B2* | 4/2014 | Ryan | G08B 13/19652 340/909 |
| 9,007,235 B2* | 4/2015 | Ryan | G08B 13/19652 340/909 |
| 9,336,666 B2* | 5/2016 | Ryan | G01R 33/10 |
| 10,657,784 B1* | 5/2020 | Gordon | G08B 13/1966 |
| 2007/0024433 A1* | 2/2007 | Garner | G09B 25/00 340/901 |
| 2008/0022596 A1* | 1/2008 | Boerger | E06B 9/82 49/31 |
| 2008/0127435 A1* | 6/2008 | Maly | B65G 69/2882 14/71.1 |
| 2009/0109049 A1* | 4/2009 | Frederick | F16P 3/147 340/686.6 |

(Continued)

FOREIGN PATENT DOCUMENTS

WO 2008014026 A1 1/2008

OTHER PUBLICATIONS

International Search Report and Written Opinion of corresponding International Application No. PCT/US2023/016444 dated Jul. 27, 2023, 10 pages.

*Primary Examiner* — Zhen Y Wu
(74) *Attorney, Agent, or Firm* — Wegman Hessler Valore

(57) ABSTRACT

A safety system for preventing collisions includes presence detection sensors oriented to sense the presence of a person or machine within a first and a second field of monitoring, and providing a visual indicator indicative of the person and/or machine sensed within the first and second fields of monitoring.

11 Claims, 6 Drawing Sheets

(56) References Cited

U.S. PATENT DOCUMENTS

| | | | |
|---|---|---|---|
| 2013/0038320 A1* | 2/2013 | Frederick | G01R 33/0206 324/207.13 |
| 2014/0028473 A1* | 1/2014 | Ryan | G08B 13/19652 340/907 |
| 2014/0184427 A1* | 7/2014 | Ryan | G08B 13/19652 340/907 |
| 2014/0191869 A1* | 7/2014 | Frederick | F16P 3/145 340/551 |
| 2015/0163945 A1* | 6/2015 | Barton | F21V 23/005 361/809 |
| 2015/0294569 A1* | 10/2015 | Ryan | G01R 33/10 340/909 |
| 2018/0082599 A1* | 3/2018 | Nguyen | G08G 9/02 |
| 2021/0332945 A1* | 10/2021 | Jones | H05B 47/13 |
| 2022/0407341 A1* | 12/2022 | McBride | H02J 7/007182 |
| 2023/0306827 A1* | 9/2023 | Ryan | G08B 13/1961 |

* cited by examiner

PRESENCE DETECTION AND INDICATOR SYSTEM AND METHOD

FIELD OF THE INVENTION

The disclosed technology is directed to a safety and warning device, and, more particularly, to a safety and warning device that senses and indicates the presence of a person or machine at a location within or outside of a building and provides a warning or indicator.

BACKGROUND OF THE INVENTION

Buildings and warehouses often have areas where potential accidents and collisions occur between pedestrians, or between pedestrians and moving machinery or vehicles. Some buildings utilize mirrors conveniently placed such that traffic approaching the intersection can see around the corner, down a stairwell or through a door to determine whether or not there is another approaching pedestrian or vehicle. However, the field of view of these mirrors is limited and if the traffic from different locations or coming from another direction is not aware of the other, collisions often occur. Mirrors do not provide an effective solution in other areas such as stairwells, and at elevator doors. Collisions occurring in these areas can cause injury to people and/or damage to merchandise or the building structure itself.

It is also known that warning sensors have been utilized on structures to alert adjacent pathways of oncoming traffic. However, these sensors typically are hardwired into an electrical system of the building such that removing or relocating the sensor is very labor intensive and time consuming. Conventional warning systems generally require a connection back to a central controller which monitors and then sends the appropriate warning message out.

BRIEF SUMMARY OF THE INVENTION

In an embodiment, a sensor assembly for attachment to a structure includes a sensor assembly comprising a motion sensor oriented to sense motion within a first field of monitoring, wherein said motion sensor generates an active output when motion is sensed within said first field of monitoring; at least one visual indicator being changeable between an active state and an inactive state; and a controller operatively connected to the at least one visual and/or audio indicator, and the motion sensor, the controller receiving the output from the motion sensor; the controller further receiving a signal indicative of motion sensed in a second field of monitoring and changing the state of the at least one visual indicator in response to a change in the output from the motion sensor and a change in the received signal; wherein said at least one visual indicator is in an active state when said controller receives an active output from the motion sensor, and said at least one visual indicator is in an inactive state when said controller receives either an inactive output from the motion sensor or the signal indicative of motion sensed in a second field of monitoring.

Advantages of the disclosed technology will become more apparent to those skilled in the art from the following description of the embodiments of the invention which have been shown and described by way of illustration.

BRIEF DESCRIPTION OF SEVERAL VIEWS OF THE DRAWINGS

These and other features of the disclosed technology, and their advantages, are illustrated specifically in embodiments of the invention now to be described, by way of example, with reference to the accompanying diagrammatic drawings, in which.

Figure 1:
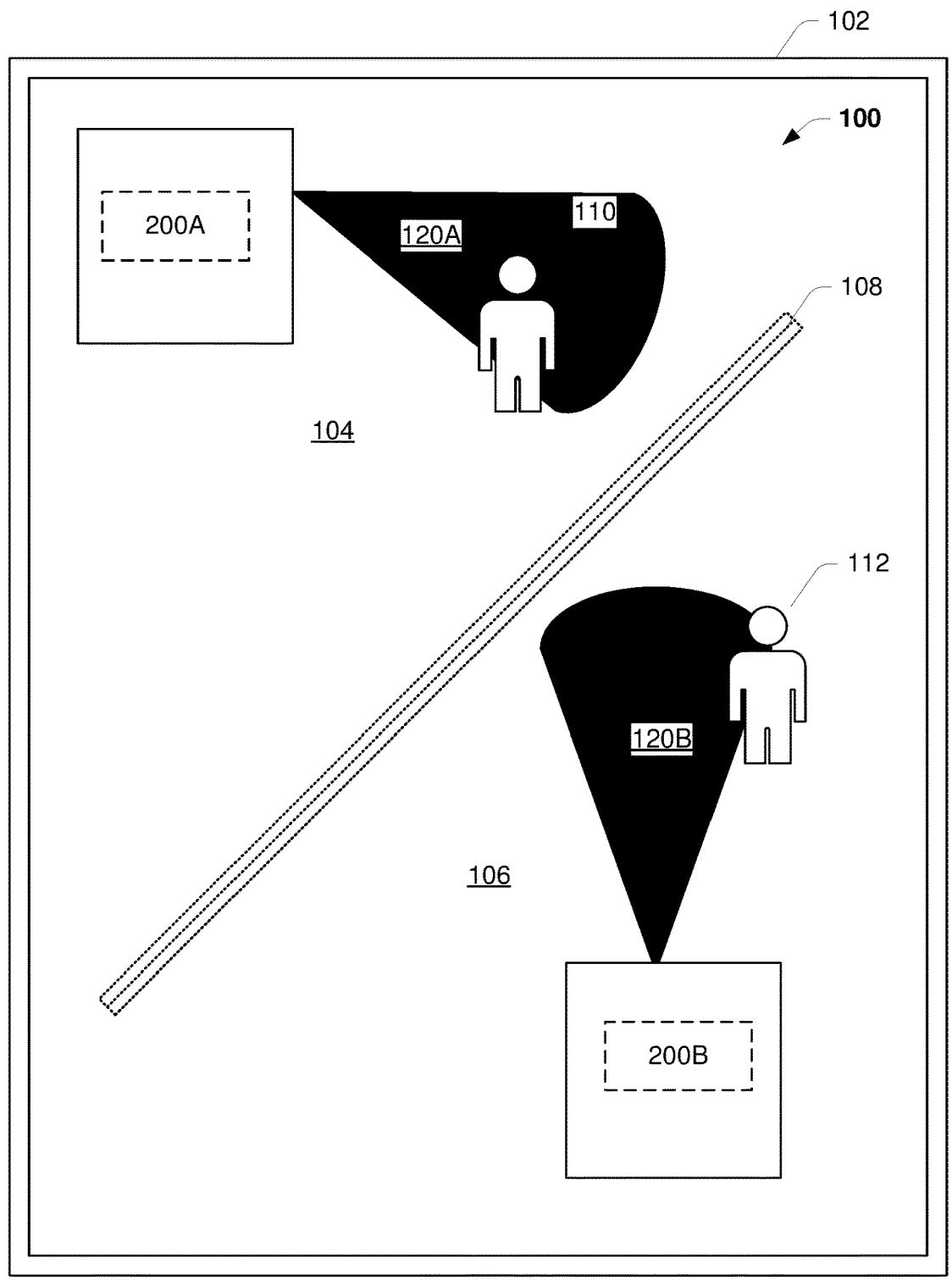
FIG. 1 is an exemplary embodiment of the presence detection and warning system of the disclosed technology.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

FIG. 1 illustrates an exemplary embodiment of a safety system that includes presence detection and a warning system having at least two separate sensor units 200*a*, 200*b* for detecting motion in at least two separated areas 104, 106 (as indicated by line 108), and for providing an indicator related to the detection of motion or non-detection of motion in the separated areas 104, 106. The sensor units can communicate directly with each other wirelessly. The sensor units communicate with each other, and do not communicate with a centralized controller, or other similar device. The sensor units can be battery operated.

For the purposes of this disclosure the two separate sensor units 200*a*, 200*b* have been described in illustrative embodiments as motion sensing devices. However, the disclosed technology is not exclusive to motion sensing, and is directed to most any presence detection sensing that is configured to sense the presence of a person or machine. For example, the presence detection sensor can include passive infrared sensors (PIR), an ultrasonic sensor, microwave sensors, tomographic sensors, visual sensor and video sensor, and combinations thereof.

The motion sensing device sensor assembly 200*a* sends a wireless signal indicative of motion detected in a first area 104. The motion sensing device receives a signal indicative of motion detected in a second, separated area 106. The motion sensing device produces an output (alarm/indicator) when motion has been detected in both the first area 104 and the second area 106.

The motion sensing device sensor assembly 200*b* sends a wireless signal indicative of motion detected in a second area 106. The motion sensing device receives a signal indicative of motion detected in a second, separated area 104. The motion sensing device produces an output (alarm/indicator) when motion has been detected in both the first area 104 and the second area 106 within the building 102.

The motion sensing devices 200*a*, 200*b* are configured to detect the presence of, or motion caused by, a person 110, 112 or machine within a respective field of monitoring 120*a*, 120*b*.

The system is intended to prevent collisions at areas where people or machines can approach the same location or area from different directions or separated areas.

Examples can include sensors and/or indicators positioned to detect presence and indicate motion, for example, on either side of a door or doorway, on the inside and outside of a garage door, intersecting aisleways, at doors leading to and from a stairwell, and for use with an elevator door. Thus, the separated areas 104 and 106 can be most any of an area that includes aisleways or separated paths, an area near an entryway, door or doorway, an area inside or outside of a garage door, an area near or at doors leading to and from a stairwell, and areas around, outside or inside an elevator door.

The separated areas 104 and 106 can be most any areas within a building where there is a potential that pedestrians and/or machines may encounter each other, and where there is not a clear line of sight between them. The separated areas 104 and 106 can be most any areas within a building where a warning or indicator of the presence of a person of machine in another nearby area would be helpful in increasing safety and preventing collisions.

In an embodiment, the system software can establish a connection between a first sensor assembly 200a and a second sensor assembly 200b. If the connection is delayed or cut off, each sensor assembly unit 200a, 200b will continue to retry to establish a wireless connection with the other at a predetermined time interval.

When motion is detected, or when the presence of a person or machine is detected, within a respective field of monitoring 120a 120b of each sensor assembly 200a, 200b, audio and visual indicators at each sensor assembly 200a, 200b are activated. Each sensor assembly unit 200a, 200b can include a low power indicator when the batteries are low.

In an embodiment, the sensor assemblies 200a, 200b are configured for use indoors, for example, within a warehouse, office space and other indoor building area.

The building configuration 102 can include areas 104, 106 where pedestrian 110, 112 or machinery traffic may potentially interfere or collide. Each sensor assembly 200a, 200b is configured to monitor movement within a monitoring field 120a, 120b to determine if a potential collision may occur and to produce a visible and/or auditory warning for oncoming traffic to prevent an accident from occurring.

In an embodiment, each sensor assembly 200a, 200b includes a single, distinct field of monitoring 120a, 120b, as shown in shaded areas in FIG. 1. The sensor assembly 200a is configured to detect motion within the field of monitoring 120a and to send a signal via Bluetooth Low Energy (BLE) to sensor assembly 200b. The sensor assembly 200b is configured to detect motion within the field of monitoring 120b. and to send a signal via Bluetooth Low Energy (BLE) to sensor assembly 200a.

In embodiments, the sensor assemblies 200a, 200b are connected to each other wirelessly using at least one of Wi-Fi, Bluetooth, Bluetooth Low Energy (BLE), infrared, cellular or most any other wireless technology. Bluetooth® Low Energy (LE) radio is designed for very low power operation. Transmitting data over 40 channels in the 2.4 GHz unlicensed ISM frequency band, the Bluetooth® LE radio provides flexibility for meeting the unique connectivity requirements of their market. Bluetooth® LE supports multiple communication topologies and can be expanded from point-to-point to broadcast and mesh. In this way, Bluetooth technology can support reliable, large-scale device networks. Bluetooth® LE can include features that enable the determination of presence, distance, and direction of another device.

The sensor assembly 200a is configured to receive a wireless signal from the sensor assembly 200b indicating that motion has been detected within field of monitoring 120b. The sensor assembly 200b is configured to receive a wireless signal from the sensor assembly 200a indicating that motion has been detected within field of monitoring 120a.

When both sensor assemblies 200a and 200b have each sent a signal indicating that motion has been detected and both sensor assemblies 200a and 200b have received a signal indicating that motion has been detected, then both sensor assemblies 200a and 200b produce a visible and/or auditory warning for all oncoming traffic to indicate, warn and to prevent an accident from occurring.

In an embodiment, the sensor assemblies 200a and 200b communicate directly with each other, and send and receive signal directly to and from each other via a wireless interface. The sensor assemblies 200a and 200b do not send or receive signals to any centralized system such as a server.

In an embodiment, the sensor assembly 200a detects motion within a field of monitoring 120a. Sensor assembly 200a receives a signal at a wireless interface of detected motion, and produces a visible and/or auditory warning. The signal of detected motion received at the wireless interface of sensor assembly 200a can be motion detected in a separate and distinct area or location from the motion detected by the sensor assembly 200a directly.

In an embodiment, the sensor assembly 200b detects motion within a field of monitoring 120b. Sensor assembly 200b receives a signal at a wireless interface of detected motion, and produces a visible and/or auditory warning. The signal of detected motion received at the wireless interface of sensor assembly 200b can be motion detected in a separate and distinct area or location from the motion detected by the sensor assembly 200b directly.

The building configuration 102 shown in FIG. 1 is merely exemplary, and the sensor assembly 200a, 200b can be utilized in most any office or building in which pedestrian and/or machinery traffic may encounter each other to prevent accidental collisions therebetween. Line 108 is illustrative only and represents a physical separation of the areas 104, 106. For example, line 108 can be a door or doorway, garage door, intersecting aisleway, door leading to and/or from a stairwell, or elevator door.

Thus, the separated areas 104 and 106 can be most any of an area that includes aisleways or separated paths, an area near an entryway, door or doorway, an area inside or outside of a garage door, an area near or at doors leading to and from a stairwell, and areas around, outside or inside an elevator door.

Figure 2:
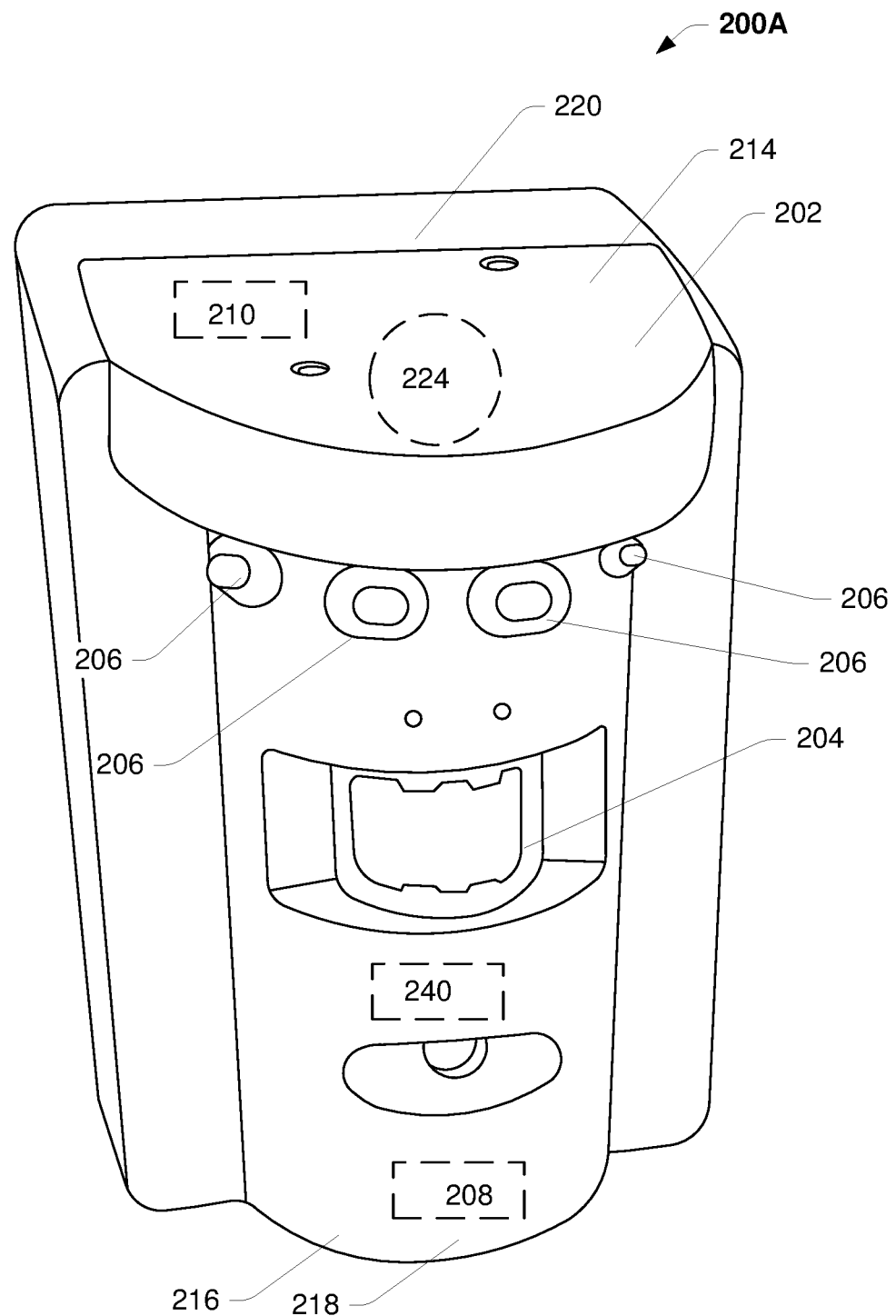
FIG. 2 is an exemplary embodiment of a motion sensing device sensor of the disclosed technology.

Referring to FIG. 2, an exemplary embodiment of a sensor assembly 200a is shown. The sensor assembly 200a can be removably positioned within an office, warehouse, or any other building area or location, wherein the sensor assembly 200a is configured to sense oncoming pedestrians, vehicles, or objects within one pathway or area and provide a warning sign to a different or separate pathway or area of an oncoming object. The sensor assembly 200a is a compact unit that can be easily installed onto a wall, walkway, storage rack, elevator, stairwell, or the like. The sensor assembly 200a is removable such that the unit can be vertically repositioned or moved from one location to another with ease.

Figure 3:
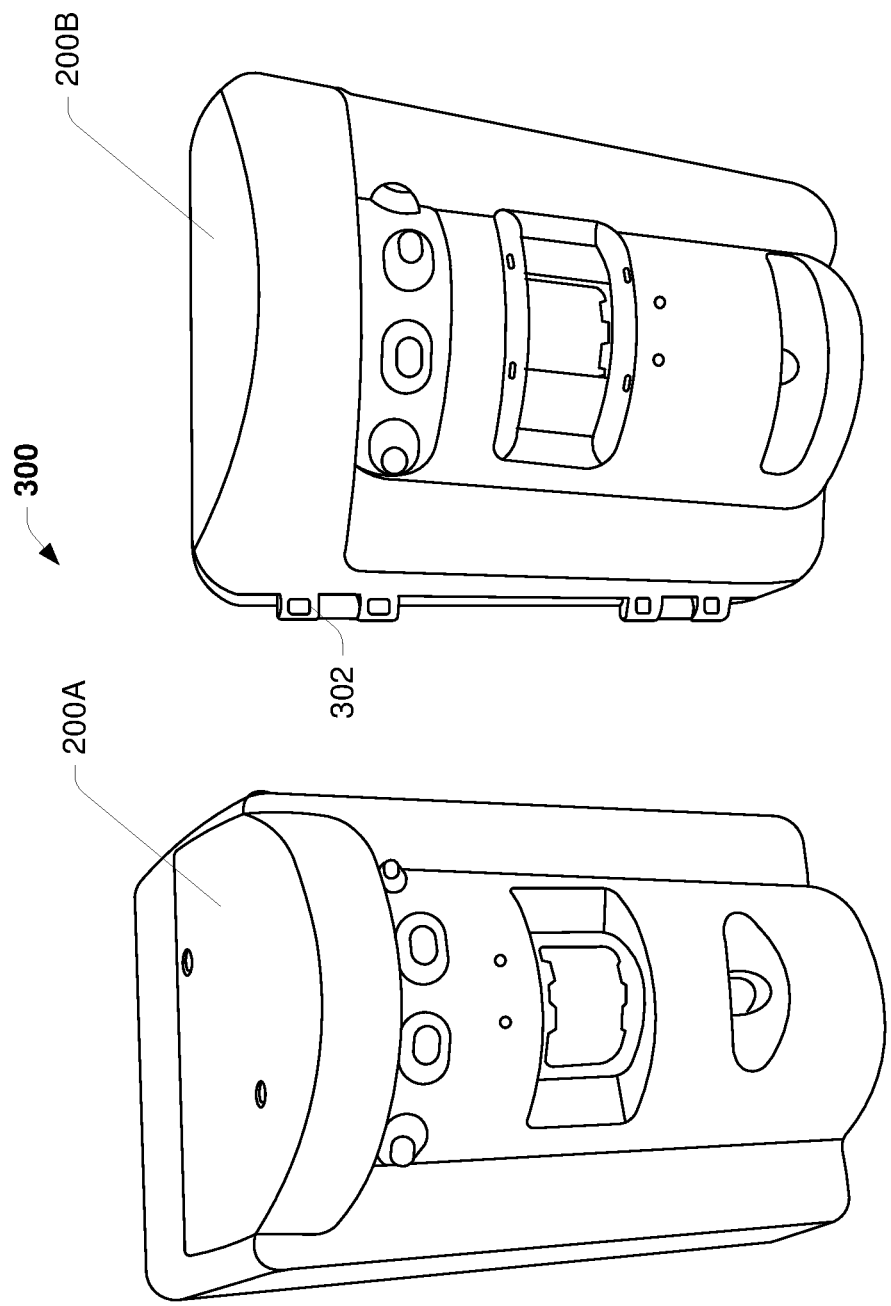
FIGS. 3A and 3B illustrate a motion sensing device sensor of the disclosed technology.

As illustrated in FIGS. 2, 3A and 3B, the sensor assembly 200a includes a housing 202, one or more a sensors 204, a plurality of visual indicators 206, a power supply 208, a controller 210, and an attachment or mounting mechanism 212. The sensor housing 202 includes an upper portion 214, an opposing lower portion 216, a front cover 218, and a rear plate 220. In embodiments, the upper and lower portions 214, 216, are integrally molded with the front cover 218. In other embodiments, the upper and lower portions 214, 216 are separately removably securable to the front cover 218 by screws, snap-locking tabs, welding or most any other attachment mechanism commonly known in the art.

In an embodiment, the upper and lower portions 214, 216 are removably secured to the front cover 218. In another embodiment, at least one of the upper and lower portions 214, 216 is integrally connected to the front cover 218. In yet another embodiment, the front cover 218 is integrally formed with at least one of the upper and lower portions 214, 216. The upper and lower portions 214, 216 and the front cover 218 are attachable to the rear plate 220.

An exemplary embodiment of a front cover 218 is shown in FIG. 2. The front cover 218 is a curved member having a front surface, a rear surface, an upper edge, and a lower edge. In an exemplary embodiment, the front cover 218 has a substantially continuous radius of curvature between the lateral edges that extend between the upper and lower edges. In another embodiment, the front cover 218 can be formed as having a squared or rectangular cross-sectional shape. In an embodiment, the front cover 218 is formed of extruded plastic, aluminum, fiberglass, or most any other material sufficient to withstand potential impact with moving vehicles or the like.

As best shown in FIG. 3B the front cover 218 can include a hinged attachment 302 to facilitate battery replacement and servicing of the interior of the sensor assembly 200b.

The rear plate 220 can be formed of metal, plastic, fiberglass, or any other material sufficient to provide a rigidity and support for the sensor assembly 200. In an embodiment, the rear plate 220 is formed of stamped metal, wherein the stamping process forms a continuous component having a non-planar shape as will be described below. The rear plate 220 includes an attachment portion. In an embodiment, the rear plate 220 is integrally formed as a single member. The rear plate 220 can be formed of any general shape that can conform to a portion of a wall or corner to which the sensor assembly 200a is attached.

The rear plate 220 can include a removable mounting plate 222. The rear plate 220 can include a plurality of holes that allow the mounting plate 222 to be attached to the rear plate 220. In an embodiment, the mounting plate 222 can be attached to a structure and the rear plate 220 is configured to allow the sensor assembly 200a to be attached to a structure utilizing the mounting plate 222.

The sensor housing 202 can be most any shape sufficient to provide at least one window through the sensor housing 202 to allow the sensor 204 and visual indicators 206 positioned within the sensor housing 202 to communicate with the ambient surroundings of the sensor assembly 200. The sensor housing 202 includes at least one visual indicator 206 directed toward one field of monitoring 120a such that a visual indicator 206 can be seen by pedestrians or machinery operators when moving in a field of monitoring 120a. The sensor assembly 200a can a include one or more visual indicators 206 that are visible to pedestrians or machinery located in more than one field of monitoring 120a.

In an example configuration, a single visual indicator 206—such as a light—can be positioned near a top portion of the sensor housing 202 and directed in a visible field of at least 180°. The single visual indicator 206 can also be positioned within the housing and configured to be visible by most all approaching traffic. In an embodiment, the housing 202 includes a window formed therethrough. In the exemplary embodiment, the window can include a lens operatively connected thereto and positioned therewithin to cover the window. A single visual indicator 206 can be used such that the visual indicator 206 can be seen from multiple fields of monitoring 120a, 120b. In the illustrated embodiment, a plurality of visual indicators 206 are used such that the visual indicators 206 can be more easily seen.

The controller 210 is an electrical component having any suitable principal functionality, the scope of which is not limited herein. For example, the controller 210 may be an analog component, a digital component, or a combination of the two, that is configured to provide certain processing and/or control functionality. In at least one examples, the controller 210 is a logic circuit, resistance circuit, programmable logic circuit, and/or an ADC. In some examples, the controller 210 is a circuit capable of performing processing and/or decision making. The controller 210 is, in some examples, a circuit capable of, or suitable for, performing a logical OR operation according to a plurality of input signals to generate an output signal that is asserted when any of the plurality of input signals is asserted.

The controller 210 can receive and monitor signals that are produced by the sensor 204 and signals received from other sensors and/or other sensor assemblies 204, to determine conditions related to the sensors.

In some examples, the controller 210 processes information based on one or more signals from the first sensor assembly 200a and/or the second sensor assembly 200b (See FIGS. 3A, 3B) and causes an output such as, for example, generating an audible signal or visual signal.

An integrated power supply 208 can be located within the sensor housing 202. The integrated power supply 208 can removable and replaceable. In the illustrated exemplary embodiment, the power supply 208 includes a plurality of batteries, such as six (6) replaceable D-type batteries or rechargeable D-type batteries. Most any other type of replaceable batteries can be used as the power supply 208. The power supply 208 is integrated within the sensor housing 202, and it is not necessary to connect the sensor assembly 200a to an external power supply such as an electrical wire or solar panel located external to the housing.

Instead, the integrated power supply 208 allows the sensor assembly 200a to be easily positioned, removable, and relocatable while allowing the sensor assembly 200a to be immediately sensing motion and able to provide a warning immediately upon installation or relocation. There is no external power needed to operate the sensor assembly 200a, whereby the integrated power supply 208 allows the sensor assembly 200a to be easily relocatable. The power supply 208 can be most any type of power source that is completely integrated within the sensor housing 202 to allow the sensor assembly 200a to be installed or relocated without additional set-up of an external power supply. The power supply 208 is configured to provide electrical power the sensor 204, the visual indicators 206, and the controller 210.

In other embodiments, the power supply 208 can be powered by an alternating current (AC) power source, or other suitable power source.

In an embodiment, the sensor 204 is integrated within the sensor housing 202. In an illustrative embodiment, the sensor assembly 200a includes a single sensor 204 positioned to monitor a field of monitoring 120a so as to sense oncoming pedestrian or machinery traffic within an area 106 (FIG. 1) and to sense and warn of the presence or motion of a person, an object, or a machine an approaching collision. The sensor 204 can be directed outwardly, and the sensor 204 is configured to sense the presence of, or to determine motion or the moving of machinery or pedestrian traffic as they approach the structure to which the sensor assembly 200a is attached. The sensor 204 is integrated and located within the sensor housing 202 and can be covered by a screen to protect the sensor 204 from damage.

The sensor 204 can be pre-adjusted in a manner that does not require the sensor 204 to be realigned, for example, if the sensor assembly 200a is relocated to a different location. The pre-adjusted sensor 204 have a fixed field of view that does not need to be changed when the sensor assembly 200a is relocated from one structure to another. Instead, the sensor 204 is configured to maximize and optimize the field of monitoring 120a for a location, or locations, adjacent to the structure to which the sensor assembly 200a it is attached. The sensor 204 can have a fixed dispersion angle.

The sensor 204 can be a motion sensor and is configured to detect the presence or movement, especially pedestrian movement, or movement of machinery within the field of monitoring 120a, as the traffic nears the sensor assembly 200a so the pedestrian or machinery operator can be warned in order to prevent a crash or contact with another pedestrian and/or machinery that is approaching the area from a different direction, as explained above with respect to FIG. 1. The sensor 204 can be passive infrared sensors (PIR), ultrasonic sensors, microwave sensors, tomographic sensors, or visual or video sensors. The sensor 204 can be most any type of sensor or a combination of these and/or other sensors configured to detect motion, or the presence of a person or machine. While the sensor 204 is configured to detect motion, the visual indicators 206 are configured to alert that an adjacent or nearby area (FIG. 1) also includes oncoming traffic.

The sensor 204 is configured to generate or provide an output when motion or presence is detected as well as an output when no motion or presence is detected. For example, when a pedestrian or machinery enters a field of monitoring 120a, the sensor 204 monitoring that field of monitoring 120a produces an active output to indicate motion within the field of monitoring 120a. When the pedestrian or machinery stops moving or moves outside the field of monitoring 120a, the sensor 204 changes to produce an inactive output to indicate there is no motion within the field of monitoring 120a. The output from each sensor 204 changes when motion is initially detected and changes again when no more motion is detected.

Once the sensor 204 monitoring the field of monitoring 120a produces an active output to indicate motion within the field of monitoring 120a, the sensor assembly 200a produces and transmits a wireless signal indicating that motion has been detected within the field of monitoring 120a. The sensor assembly 200a is configured to receive a wireless signal indicative of motion detected in a separate field of monitoring 120b.

The visual indicators 206 are configured to provide a visual alert or warning to approaching pedestrians or machinery of traffic approaching from two separate areas or locations. Each separate area or location is associated with a separate fields of monitoring.

In an embodiment, the visual indicators 206 are formed as light emitting diodes (LEDs), halogen bulbs, or any other electrically controllable light source. The visual indicators 206 include an inactive state in which no visual alert is being produced as well as an active state in which the visual alert is provided or illuminated. In an embodiment, when the visual indicators 206 are in the active state, the visual alert is a constant-on state. In another embodiment, when the visual indicators 206 are in the active state, the visual alert is an intermittent or flashing. The active state of the visual indicators 206 can provide any visual alert or cue sufficient to provide a warning to pedestrian and machinery traffic approaching the sensor assembly 200.

The sensor 204 and visual indicators 206 are located within the sensor housing 202, and a screen or lens can be positioned over each visual indicator 206 and sensor 204 to provide protection to these members from any dirt or debris while still allowing full functionality of the sensor 204 without signal degradation, and also allowing the visual alert to be seen by oncoming pedestrians and machinery operators. The visual indicators 206 as well as the sensor 204 is operatively controlled by the controller 210.

As shown in FIG. 2, the sensor assembly includes a wireless transceiver 240. The wireless transceiver 240 can be configured to send and receive signals indicating that motion or presence has been detected within a field of monitoring.

In accordance with an embodiment, the wireless transceiver 240 comprises a Bluetooth® Low Energy (LE) module. the Bluetooth® Low Energy (LE) radio is designed for very low power operation. Transmitting data over 40 channels in the 2.4 GHz unlicensed ISM frequency band, the Bluetooth® LE radio provides flexibility for meeting the unique connectivity requirements. Bluetooth® LE supports multiple communication topologies and can be expanded from point-to-point to broadcast and mesh. In this way, Bluetooth technology can support reliable, large-scale device networks. Bluetooth® LE can include features that enable the determination of presence, distance, and direction of another device.

Still referring to FIG. 2, the controller 210 is positioned within the housing 202, and receives electrical power from the power supply 208. The sensor 204 is configured to generate an output that is received by the controller 210, wherein the output generated by the sensor 204 indicates either the lack of detected motion or the presence of detected motion. In an embodiment, the sensor 204 is in an always-on state in which the sensor 204 is continually monitoring its field of monitoring while continually providing an output that is received by the controller 210 to indicate the presence or absence of detected motion.

When there is no motion within a field of monitoring 120a for a sensor 204, the sensor 204 provides an inactive output to the controller 210 indicating that there is no motion. Otherwise, when there is motion sensed in the field of monitoring 120a for a sensor 204, the sensor 204 provides an active output to the controller 210 indicating that there is motion.

When the controlled 210 has received an active output indicative of motion in the field of monitoring 120a and the controller 210 has received a signal indicative of motion sensed in a separate field of monitoring 120b, the sensor assembly 200a can produce an audio and/or visual indicator. The sensor 204 is constantly monitoring for motion within its field of monitoring 120a, the controller 210 is continually receiving output provided by the sensor 204 and signals indicative of motion sensed in a separate field of monitoring 120b to determine if and when there is a change in either.

When motion ceases to be detected in one of or all (simultaneously) of the fields of monitoring 120a, 120b, the output provided to the controller 210 by at least one sensor 204 changes to indicate no motion and the controller 210 changes the visual indicators 206 from the active state to the inactive state. When motion is sensed in both of the fields of monitoring 120a, 120b, the controller 210 in each sensor assembly 200a, 200b changes the visual indicators 206 to an active state such that the pedestrian traffic or vehicle operators in both areas 104, 106 are alerted of oncoming traffic and are warned of the presence of another person, object, or machine and/or a potential collision or accident. In an embodiment, when the controller 210 determines that there is motion detected in a first, single field of monitoring 120a, the controller receives a signal from a different sensor assembly that motion has been detected in a second, single field of monitoring 120b the controller 210 changes all visual indicators 206 to an active state.

Thus, in an embodiment, when motion is sensed in a single field of monitoring 120a or 120b, the visual indicators 206 are inactive. The controller 210 can be configured to change all visual indicators 206 to an active state only when motion is sensed within both the field of monitoring 120a, 120b associated with the sensor assemblies 200a, 200b. By changing the visual indicators 206 to an active state only when motion is sensed in two separate fields of monitoring 120a, 120b instead of when motion is sensed in only one field of monitoring 120a, the drain on the power supply 208 is reduced.

In another embodiment, the visual indicators 206 have an override mode in which the visual indicators 206 remain in a continuous active state without regard to the output from the sensor 204. For example, a depressible override button (not shown) extends from the sensor housing 202. The override button is operatively connected to the controller 210, wherein the override button is depressible to override the outputs from the sensor 204 and causes the controller 210 to change the visual indicators 206 to remain in an active state. This can be particularly useful when someone is continuously working in an area so as to warn and caution all approaching traffic that there is a collision potential at a location.

When the override button is initially depressed, the visual indicators 206 are changed to the active state until the override button is depressed again, wherein the sensor 204 again continuously monitoring their respective field of monitoring 120a, 120b and the state of the visual indicators 206 are changed accordingly. This override button can be used when the sensor assembly 200a is attached to the rear corner of a tractor trailer when loading/unloading the trailer. The override button activates the visual indicators 206 so that any approaching pedestrians or other machinery are alerted that an operator is continuously loading or unloading the trailer.

In another embodiment, the sensor assembly 200a includes an audible indicator (not shown) in addition to the visual indicators 206 to provide an audible sound to indicate detected motion in both fields of monitoring 120a, 120b. The audible indicator is operatively connected to the controller 210 such that the controller can change the audible indicator between an inactive state and an active state. In operation, the controller 210 changes the visual indicators 206 and the audible indicator to the active state simultaneously when motion is sensed in both adjacent fields of monitoring 120a, 120b and likewise changes the visual indicators 206 and the audible indicator to an inactive state no motion is sensed in at least one of the fields of monitoring 120a, 120b.

In an embodiment, the sensor assembly 200a includes a power indicator (not shown) that is illuminated or flashes when the power supply 208 is low on power. The power indicator can be a light that shines or flashes or can be an audible sound to indicate that the power supply 208 is low.

In another embodiment, a tether or zip-tie can be used in combination with the magnets 224 to secure the sensor assembly 200a to a structure to prevent the assembly from becoming disengaged if bumped or struck by person or a moving vehicle. The tether or zip-tie can be used to provide additional support or securing mechanism for the sensor assembly 200.

Referring to FIGS. 3A and 3B, an exemplary embodiment of a safety system that including presence detection and warning indicators inlcuding sensor assemblies 200a, 200b are shown. The sensor assemblies 200a, 200b can be removably positioned within an office, warehouse, or any other building, wherein the sensor assemblies 200a, 200b are configured to sense oncoming pedestrians, vehicles, or objects within two physically separate areas or locations and provide a warning sign to via both sensor assemblies 200a, 200b of the presence of a pedestrians, vehicles, or objects. The sensor assemblies 200a, 200b is a compact unit that can be easily installed onto a wall, walkway, storage rack, elevator, stairwell, or the like.

As best shown in FIG. 3B, the front cover 218 can include a hinged attachment 302 to facilitate battery replacement and servicing of the interior of the sensor assembly 200b.

In an embodiment, each sensor assembly 200a, 200b includes the features of the sensor assembly 200a described in detail above in connection with FIG. 2. The sensor assemblies 200a, 200b are configured to send and receive signals directly to and from each other. The sensor assembly 200a, 200b can be identical to each other or the sensor assembly 200a, 200b can include different features while still providing the functionality described herein in connection with the disclosed system and methods.

In embodiments, the sensor assemblies 200a, 200b are connected to each other wirelessly using at least one of Wi-Fi, Bluetooth, Bluetooth Low Energy (BLE), infrared, cellular or most any other wireless technology. Bluetooth® Low Energy (LE) radio is designed for very low power operation. Transmitting data over 40 channels in the 2.4 GHz unlicensed ISM frequency band, the Bluetooth® LE radio provides flexibility for meeting the unique connectivity requirements of their market. Bluetooth® LE supports multiple communication topologies and can be expanded from point-to-point to broadcast and mesh. In this way, Bluetooth technology can support reliable, large-scale device networks. Bluetooth® LE can include features that enable the determination of presence, distance, and direction of another device.

Figure 4:
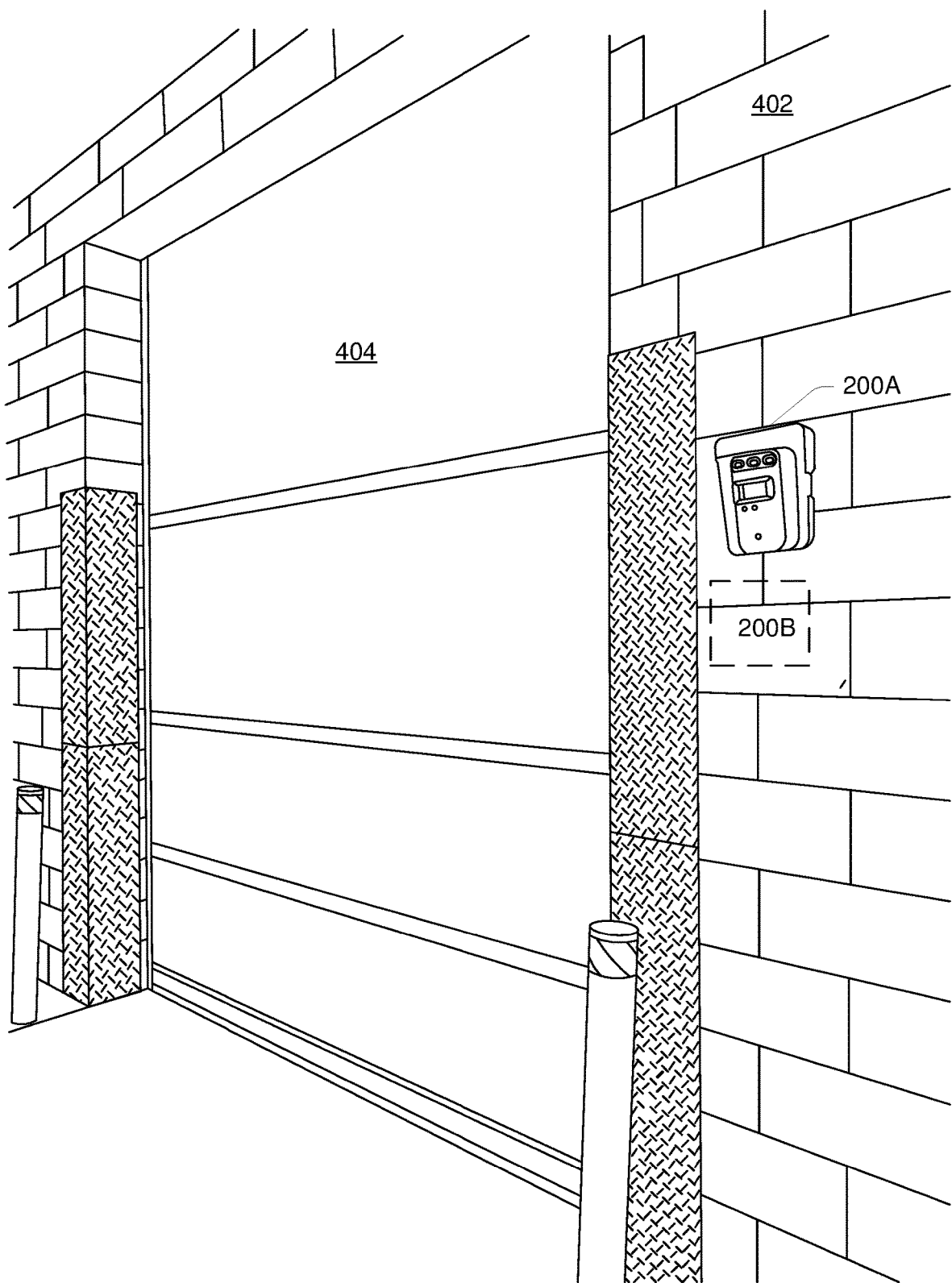
FIG. 4 is an exemplary embodiment of the system of the disclosed technology.

Referring to FIG. 4, an exemplary embodiment of a presence detection and warning system of the disclosed technology 400 including at least two sensor assemblies 200a and 200b is shown. The sensor assembly 200a is secured to the outside of a building 402 in proximity to a dock door 404, garage door or other building entry point. A second sensor assembly 200b is positioned within the building 402 in proximity to the same dock door 404.

When motion is detected, or when the presence of a person or machine is detected, within a respective field of monitoring 120a 120b of each sensor assembly 200a, 200b, the audio and/or visual indicators at each sensor assembly 200a, 200b are activated. Each sensor assembly 200a, 200b changes the visual indicators 206 to an active state such that the pedestrian traffic or vehicle operators in the areas in proximity to the dock door 404 both outside the building 402 and inside the building 402 are alerted of oncoming traffic and are warned of the presence of another person, object, or machine and/or a potential collision at that location.

Figure 5:
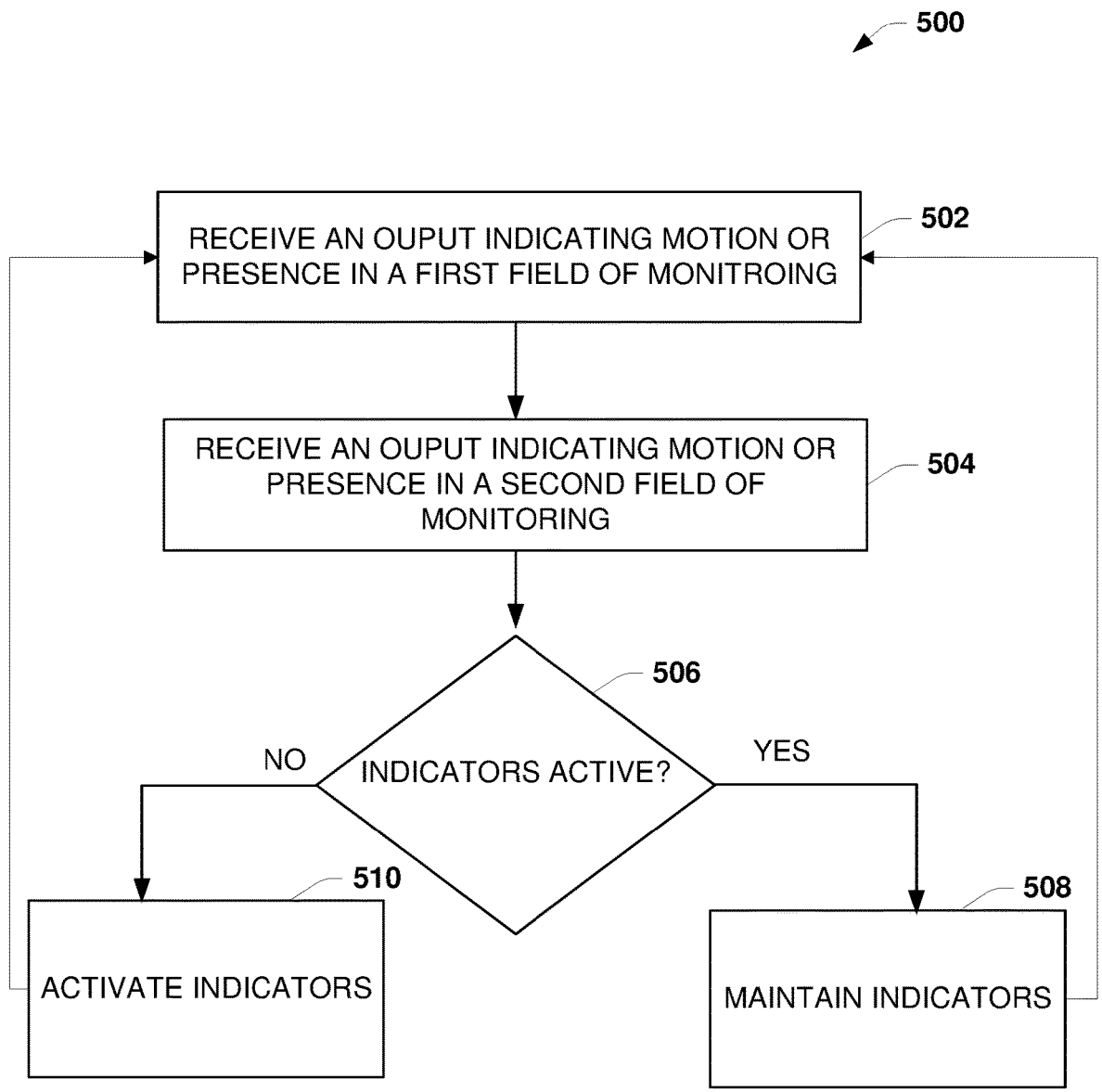
FIG. 5 is flow chart in accordance with an exemplary embodiment of the disclosed method.

As shown in the flowchart of FIG. 5, in the operation of an embodiment of a sensor assembly 200a in accordance with method 500, the controller 210 receives the output from at least one sensor 204 monitoring one of the fields of monitoring 120a to determine if there is currently sensed motion therewithin, as shown in block 502. If there is motion sensed in one of the fields of monitoring 120a, the controller 210 receives a signal indicating the output from at least one sensor monitoring a physically separate field of monitoring 120b to determine if there is currently sensed motion in a separate location or area, as shown in block 504.

When the controller 210 receives an active output from the first sensor 204 indicating that there is sensed motion in a first field of monitoring 120a, and a signal from a second sensor indicating that there is sensed motion in a second field of monitoring 120b, the controller 210 determines if the visual indicators 206 are already in an active state, as shown in block 506. If all visual indicators 206 are in an active state, then the controller 210 maintains the visual indicators 206 in the active state, as shown in block 508. Otherwise, if all of the visual indicators 206 are not in an active state, then the controller 210 changes the visual indicators 206 to the active state, as shown in block 510.

The method 500 can include monitoring a first field of monitoring to detect a presence of a person or a machine, receiving at a controller an output indicating the presence of a person or a machine in the first field of monitoring, monitoring a second field of monitoring to detect a presence of a person or a machine, receiving at the controller a second output indicating the presence of a person or a machine in the second field of monitoring, activating a first set of visual indicators associated with the first field of monitoring, and activating a second set of visual indicators associate with the second field of monitoring.

The first field of monitoring can be physically separate from the second field of monitoring. The first set of visual indicators and the second set of visual indicators can be maintained in an active state while the output indicating the presence of a person or a machine in the first field of monitoring and the output indicating the presence of a person or a machine in the second field of monitoring are present.

Figure 6:
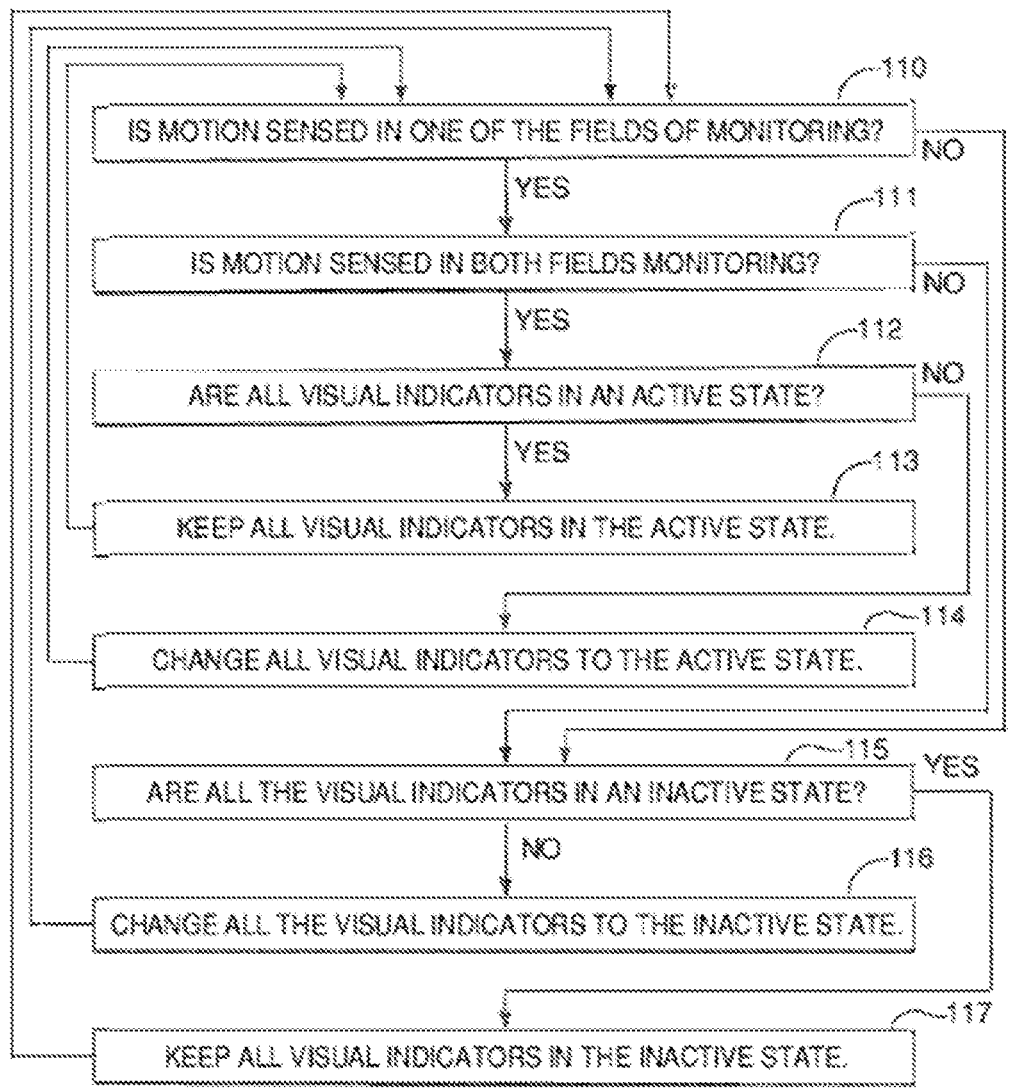
FIG. 6 is flow chart in accordance with an exemplary embodiment of the disclosed method.

As shown in the flowchart of FIG. 6, the method 600 begins when the controller receives an output from at least one sensor assemblies 200a, 200b monitoring one of the fields of monitoring 120a, 120b to determine if there is currently sensed motion therewithin, as shown in block 110. If there is motion sensed in one of the fields of monitoring 120a, 120b, the controller receives the output from at least one sensor monitoring the other field of monitoring to determine if there is currently sensed motion therewithin, as shown in block 111. If the controller receives an active output from sensors indicating that there is sensed motion in both fields of monitoring, the controller determines if all the visual indicators are already in an active state, as shown in block 112. If all visual indicators are in an active state, then the controller maintains the visual indicators in the active state, as shown in block 113. Otherwise, if all of the visual indicators are not in an active state, then the controller changes the visual indicators to the active state, as shown in block 114.

When motion has been detected in both of the fields of monitoring 120a, 120b and the visual indicators 206 are in the active state, the controller receives the output from at least one sensor monitoring one of the fields of monitoring to determine if there is currently sensed motion therewithin, as shown in block 110. If there is no motion detected in one of the fields of monitoring, as determined in block 110, or if motion is sensed in one of the fields of monitoring but not both, as determined in block 111, then the controller determines if all the visual indicators are already in an inactive state, as shown in block 115. If all of the visual indicators are not in an inactive state, then the controller changes the visual indicators to the inactive state, as shown in block 116.

Otherwise, if all visual indicators are in an inactive state, then the controller maintains the visual indicators in the inactive state, as shown in block 117. When motion has not been detected in one of the fields of monitoring or motion has been detected in one but not both of the fields of monitoring and the visual indicators 206 are in the inactive state, the controller receives the output from at least one sensor monitoring one of the fields of monitoring to determine if there is currently sensed motion therewithin, as shown in block 110.

Each of the sensor assemblies 200a, 200b can be configured to work together and to perform the acts associated with the methods illustrated in FIGS. 5 and 6.

A presence detection and warning system includes a first sensor assembly for attachment to a structure, said sensor assembly comprising a first motion sensor oriented to sense motion within a first field of monitoring, wherein said first motion sensor generates a first active output when motion is sensed within said first field of monitoring or a first inactive output when no motion is sensed within said first field of monitoring; a second sensor assembly for attachment to a structure, said sensor assembly comprising a second motion sensor oriented to sense motion within a second field of monitoring, wherein said second motion sensor generates a second active output when motion is sensed within said second field of monitoring or a second inactive output when no motion is sensed within said second field of monitoring, said first field of monitoring being different than sand physically separated from said second field of monitoring each of the first and second sensor assemblies further including at least one visual indicator being changeable between an active state and an inactive state; and each of the first and second sensor assemblies further including a controller operatively connected to the at least one visual indicator, and the respective motion sensor, the controller receiving the output from the respective motion sensor; each controller further receiving a signal indicative of motion sensed in the field of monitoring of the other sensor assembly and changing the state of the at least one visual indicator in response to a change in the output from the motion sensor and a change in the received signal; wherein said at least one visual indicator is in an active state when said controller receives an active output from the motion sensor and a signal indicative of motion sensed, and said at least one visual indicator is in an inactive state when said controller receives either an inactive output from the motion sensor or the signal indicative of motion sensed in a second field of monitoring.

The at least one visual indicator can further includes an override state in which said at least one visual indicator remains in continuous active state without regard to said output from said sensor. The at least one visual indicator can include two or more visual indicators. Each visual indicator can be directed toward a different direction.

The signal indicative of motion sensed in a second field of monitoring is transmitted using at least one of: Wi-Fi, Bluetooth, Bluetooth Low Energy (BLE), infrared and cellular.

A safety system for preventing collisions includes a presence detection sensor oriented to sense the presence of a person or machine within a first field of monitoring, wherein said presence detection sensor generates an active output when the person or machine is sensed within said first field of monitoring, at least one visual and/or audio indicator being changeable between an active state and an inactive state, and a controller operatively connected to the at least one visual indicator, and the presence detection sensor, the controller receiving the output from the presence detection sensor. The controller further receiving a signal indicative of the presence of a person or machine in a second field of monitoring and changing the state of the at least one visual indicator in response to a change in the output from the presence detection sensor and a change in the received signal, wherein said at least one visual indicator is in an active state when said controller receives an active output from the presence detection sensor, and said at least one visual indicator is in an inactive state when said controller receives either an inactive output from the presence detection sensor or the signal indicative of a person or machine sensed in a second field of monitoring.

The presence detection sensor comprises at least one of a passive infrared sensors (PIR), an ultrasonic sensor, microwave sensors, tomographic sensors, visual sensor and video sensor.

The at least one visual indicator can further includes an override state in which said at least one visual indicator remains in continuous active state without regard to said output from said sensor. The at least one visual indicator includes two or more visual indicator. Each visual indicator can be oriented in a different direction.

A sensor assembly for attachment to a structure, said sensor assembly includes a housing having an integrated power supply positioned within said housing, a motion sensor oriented to sense motion within a first field of monitoring, wherein said motion sensor generates a first active output when motion is sensed within said first field of monitoring or a first inactive output when no motion is sensed within said first field of monitoring, at least one visual and/or audio indicator is operatively connected to one of said at least one pair of landings of said holder and to said power supply, said at least one visual indicator being changeable between an active state and an inactive state, and a controller operatively connected to the at least one visual indicator, and the motion sensor, the controller receiving the output from the motion sensor. The controller further receiving a signal indicative of motion sensed in a second field of monitoring and changing the state of the at least one visual indicator in response to a change in the output from the motion sensor and a change in the received signal, wherein said at least one visual indicator is in an active state when said controller receives an active output from the motion sensor, and said at least one visual indicator is in an inactive state when said controller receives either an inactive output from the motion sensor or the signal indicative of motion sensed in a second field of monitoring.

A method for preventing collisions includes monitoring a first field of monitoring to detect a presence of a person or a machine, receiving at a controller an output indicating the presence of a person or a machine in the first field of monitoring, monitoring a second field of monitoring to detect a presence of a person or a machine, receiving at the controller a second output indicating the presence of a person or a machine in the second field of monitoring, activating a first set of visual indicators associated with the first field of monitoring, and activating a second set of visual indicators associate with the second field of monitoring.

The first field of monitoring is physically separate from the second field of monitoring. The first set of visual indicators and the second set of visual indicators can be maintained in an active state while the output indicating the presence of a person or a machine in the first field of monitoring and the output indicating the presence of a person or a machine in the second field of monitoring are present.

While, for purposes of simplicity of explanation, the methodologies illustrated in the figures are shown and described as a series of acts, it is to be understood and appreciated that the subject disclosure is not limited by the order of acts, as some acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosure.

While embodiments of the disclosed systems and methods have been described, it should be understood that the disclosed systems and methods are not so limited, and modifications may be made without departing from the disclosed systems and methods. The scope of the systems and method are defined by the appended claims, and all devices, processes, and methods that come within the meaning of the claims, either literally or by equivalence, are intended to be embraced therein.

The invention claimed is:

1. A presence detection and warning system comprising, a first sensor assembly for attachment to a structure, said sensor assembly comprising a first motion sensor oriented to sense motion within a first field of monitoring, wherein said first motion sensor generates a first active output when motion is sensed within said first field of monitoring or a first inactive output when no motion is sensed within said first field of monitoring;

a second sensor assembly for attachment to a structure, said sensor assembly comprising a second motion sensor oriented to sense motion within a second field of monitoring, wherein said second motion sensor generates a second active output when motion is sensed within said second field of monitoring or a second inactive output when no motion is sensed within said second field of monitoring, said first field of monitoring being different than and physically separated from said second field of monitoring;

the first sensor assembly further including a first visual indicator being changeable between an active state and an inactive state;

the second sensor assembly further including a second visual indicator being changeable between an active state and an inactive state;

the first sensor assembly further including a first controller operatively connected to the first visual indicator, and the first motion sensor, the first controller receiving the output from the first motion sensor;

the first controller further receiving a signal indicative of motion sensed in the second field of monitoring and changing the state of the first visual indicator in response to a change in the output from the second motion sensor and a change in the received signal;

wherein said first visual indicator is in an active state when said first controller receives an active output from the second motion sensor and a signal indicative of motion sensed, and said first visual indicator is in an inactive state when said first controller receives either an inactive output from the second motion sensor or the signal indicative of motion not sensed in a second field of monitoring; and wherein the signal indicative of motion sensed in a second field of monitoring is transmitted using at least one of: Wi-Fi, Bluetooth, Bluetooth Low Energy (BLE), infrared and cellular.

2. The presence detection and warning system of claim 1, wherein said at least one visual indicator further includes an override state in which said at least one visual indicator remains in continuous active state without regard to said output from said sensor.

3. The presence detection and warning system of claim 1, wherein said at least one visual indicator includes two or more visual indicators.

4. The presence detection and warning system of claim 3, wherein each visual indicator is directed toward a different direction.

5. The presence detection and warning system of claim 1, wherein said at least one visual indicator is positioned within said housing.

6. The presence detection and warning system of claim 1, wherein said at least one visual indicator includes only one visual indicator, wherein said visual indicator is positioned adjacent to a bottom of said housing.

7. The presence detection and warning system of claim 1, further comprising a plurality of magnet assemblies attachable to said housing for attaching said housing to said structure.

8. The presence detection and warning system of claim 7, wherein each of said plurality of magnet assemblies includes a plate and a magnetic member operatively connected by a attachment mechanism, said plate and said magnetic member being secured together in a spaced apart manner to form a gap therebetween.

9. The presence detection and warning system of claim 1, wherein said outputs provided by said motion sensors are continuous.

10. The presence detection and warning system of claim 1, wherein the signal indicative of motion sensed in a second field of monitoring is transmitted using Bluetooth Low Energy (BLE) adapted to determine of presence, distance, and direction of another device.

11. The presence detection and warning system of claim 10, wherein:
a) said first field of monitoring is physically separated from said second field of monitoring by a physical separation that is a door or doorway, garage door, door leading to and/or from a stairwell, or elevator door; and
b) the first motion sensor:
i) has a fixed field of view that does not need to be changed when the first sensor assembly is relocated, and
ii) has a fixed dispersion angle.

* * * * *